US012785550B2

(12) United States Patent
Sreedhar et al.

(10) Patent No.: US 12,785,550 B2
(45) Date of Patent: Nov. 3, 2026

(54) SYSTEMS AND METHODS FOR COMMON DESIGN FOR SINGLE, SPLIT, AND THREE PHASE INVERTER FOR V2X APPLICATIONS

(71) Applicant: BorgWarner US Technologies LLC, Wilmington, DE (US)

(72) Inventors: Sunil Sreedhar, Westfield, IN (US); Alexandre M. S. Reis, Westfield, IN (US)

(73) Assignee: BorgWarner US Technologies LLC, Wilmington, DE (US)

( * ) Notice: Subject to any disclaimer, the term of this patent is extended or adjusted under 35 U.S.C. 154(b) by 559 days.

(21) Appl. No.: 18/340,472

(22) Filed: Jun. 23, 2023

(65) Prior Publication Data

US 2024/0429831 A1 Dec. 26, 2024

(51) Int. Cl.
*H02M 1/42* (2007.01)
*B60L 55/00* (2019.01)
*H02M 1/00* (2007.01)
*H02M 1/10* (2006.01)
*H02M 7/217* (2006.01)

(52) U.S. Cl.
CPC ........... *H02M 1/4233* (2013.01); *B60L 55/00* (2019.02); *H02M 1/007* (2021.05); *H02M 1/10* (2013.01); *B60L 2210/30* (2013.01); *H02M 7/2173* (2013.01)

(58) Field of Classification Search
CPC .... H02M 7/2173; H02M 7/219; H02M 1/007; H02M 1/10; H02M 1/4233; B60L 58/00
See application file for complete search history.

(56) References Cited

U.S. PATENT DOCUMENTS

2018/0278193 A1* 9/2018 Gurkaynak ............. H02S 40/32
2022/0021293 A1* 1/2022 Esmoris Bertoa ...... H02M 1/10
2022/0224250 A1* 7/2022 Koerner ................. H02M 1/10
2022/0337166 A1 10/2022 Chan et al.

FOREIGN PATENT DOCUMENTS

WO 2022135744 A1 6/2022

OTHER PUBLICATIONS

Yuan Jiaqi et al: "A Review of Bidirectional On-Board Chargers for Electric Vehicles", IEEE Access, IEEE, USA, vol. 9, Mar. 29, 2021 (Mar. 29, 2021), pp. 51501-51518, XP011848400.

* cited by examiner

*Primary Examiner* — Jue Zhang
(74) *Attorney, Agent, or Firm* — Joshua M. Haines; Bookoff McAndrews, PLLC

(57) ABSTRACT

A system includes: a bidirectional alternating current (AC) to direct current (DC) converter (AC-DC converter) connectable to a line voltage and a battery, the AC-DC converter including: one or more leaves connectable to the line voltage and the battery, the one or more leaves configured to receive DC voltage from the battery and generate AC voltage for the line voltage, and a neutral leaf connectable to the line voltage and the battery, the neutral leaf configured to provide a return path for the generated AC voltage from the line voltage to the AC-DC converter; and one or more controllers configured to control an operation of the one or more leaves and the neutral leaf to control the AC voltage.

18 Claims, 12 Drawing Sheets

SYSTEMS AND METHODS FOR COMMON DESIGN FOR SINGLE, SPLIT, AND THREE PHASE INVERTER FOR V2X APPLICATIONS

TECHNICAL FIELD

Various embodiments of the present disclosure relate generally to systems and methods for a common design for single, split, and three phase inverters for various vehicle applications and, more particularly, to systems and methods for a bidirectional AC-DC converter including one or more leaves for generating one or more single phase AC voltage outputs, three phase AC voltage outputs, or split phase AC voltage outputs for a load.

BACKGROUND

In the field of battery chargers, onboard chargers (OBCs) may integrate a bidirectional system that converts alternating current (AC) to direct current (DC) voltage in charging mode and DC to AC in discharge or inverter mode. A single stage or two or more stage design for the OBCs may generally be used to meet automotive requirements. OBCs may include an AC-DC converter at stage I and a DC-DC converter at stage II. OBCs can be used to operate in charge mode or discharge mode. Similarly, inverters may include vehicle to load, vehicle to grid, and vehicle to vehicle inverters (referred to as V2X inverters). However, some OBCs and V2X inverters may not be configured to produce various AC outputs that are required to handle certain loads.

The present disclosure is directed to overcoming one or more of these above-referenced challenges.

SUMMARY OF THE DISCLOSURE

In some aspects, the techniques described herein relate to a system including: a bidirectional alternating current (AC) to direct current (DC) converter (AC-DC converter) connectable to a line voltage and a battery, the AC-DC converter including: one or more leaves connectable to the line voltage and the battery, the one or more leaves configured to receive DC voltage from the battery and generate AC voltage for the line voltage, and a neutral leaf connectable to the line voltage and the battery, the neutral leaf configured to provide a return path for the generated AC voltage from the line voltage to the AC-DC converter; and one or more controllers configured to control an operation of the one or more leaves and the neutral leaf to control the AC voltage.

In some aspects, the techniques described herein relate to a system, wherein the one or more controllers are configured to control the operation of the one or more leaves and the neutral leaf to control the AC voltage to be each of a single phase AC voltage, a three phase AC voltage, and a split phase AC voltage.

In some aspects, the techniques described herein relate to a system, wherein: the one or more leaves includes a first leaf and a second leaf, the one or more controllers are configured to operate the first leaf to generate a first AC voltage at a first voltage level, and the one or more controllers are configured to operate the second leaf to generate a second AC voltage at a second voltage level that is different from the first voltage level.

In some aspects, the techniques described herein relate to a system, wherein: the one or more leaves includes a first leaf and a second leaf, the one or more controllers are configured to operate the first leaf to generate a first AC voltage at a first phase, and the one or more controllers are configured to operate the second leaf to generate a second AC voltage at a second phase that is different from the first phase.

In some aspects, the techniques described herein relate to a system, wherein: the AC voltage is a split phase voltage, and the first phase and the second phase are 180 degrees from each other.

In some aspects, the techniques described herein relate to a system, wherein: the one or more leaves includes a third leaf, and the one or more controllers are configured to operate the third leaf to generate a third AC voltage at a third phase that is different from the first phase and the second phase.

In some aspects, the techniques described herein relate to a system, wherein: the AC voltage is a three phase voltage, and the first phase, the second phase, and the third phase are 120 degrees from each other.

In some aspects, the techniques described herein relate to a system, further including: one or more bypass relays connected to the one or more leaves, wherein the one or more controllers are further configured to operate the one or more bypass relays to control the AC voltage.

In some aspects, the techniques described herein relate to a system, wherein: the one or more leaves includes a first leaf and a second leaf, and the one or more controllers are configured to operate the first leaf and the second leaf to increase a current output of the AC-DC converter to the line voltage.

In some aspects, the techniques described herein relate to a system, wherein: each leaf of the one or more leaves includes an upper switch and a lower switch, and the one or more controllers are further configured to operate the upper switch and the lower switch of each leaf to control the AC voltage.

In some aspects, the techniques described herein relate to a system, wherein: the neutral leaf includes an upper switch and a lower switch, and the one or more controllers are further configured to operate the upper switch and the lower switch of the neutral leaf at a higher switching frequency than the upper switch and the lower switch of each leaf.

In some aspects, the techniques described herein relate to a system, further including: a DC to DC converter (DC-DC converter) connected to the AC-DC converter, the DC-DC converter connectable to the battery to connect the AC-DC converter to the battery.

In some aspects, the techniques described herein relate to a system, further including: the battery connected to the DC-DC converter, wherein the system is provided as a bidirectional battery charger configured to: receive input AC power from the line voltage through the AC-DC converter, convert the AC power to DC power, and supply the DC power to the battery to charge the battery in a grid-to-battery operation, and receive DC power from the battery through the DC-DC converter, convert the DC power to AC power, and supply the AC power to a load of the line voltage as output AC power in a battery-to-grid operation.

In some aspects, the techniques described herein relate to a system, further including: an electric vehicle including the battery connected to the DC-DC converter, wherein the battery-to-grid operation is operable to supply electric power from the battery to an AC outlet of the electric vehicle as the load of the line voltage.

In some aspects, the techniques described herein relate to a method for controlling a system including a bidirectional alternating current (AC) to direct current (DC) converter (AC-DC converter) connectable to a line voltage and a battery, the AC-DC converter including: one or more leaves connectable to the line voltage and the battery, the one or more leaves configured to receive DC voltage from the battery and generate AC voltage for the line voltage, and a neutral leaf connectable to the line voltage and the battery, the neutral leaf configured to provide a return path for the generated AC voltage from the line voltage to the AC-DC converter, the method including: performing, by one or more controllers, operations including: controlling an operation of the one or more leaves and the neutral leaf to control the AC voltage.

In some aspects, the techniques described herein relate to a method, wherein the operations further include: controlling the operation of the one or more leaves and the neutral leaf to control the AC voltage to be each of a single phase AC voltage, a three phase AC voltage, and a split phase AC voltage.

In some aspects, the techniques described herein relate to a method, wherein the operations further include: operating a first leaf of the one or more leaves to generate a first AC voltage at a first voltage level, and operating a second leaf of the one or more leaves to generate a second AC voltage at a second voltage level that is different from the first voltage level.

In some aspects, the techniques described herein relate to a method, wherein the operations further include: operating a first leaf of the one or more leaves to generate a first AC voltage at a first phase, and operating a second leaf of the one or more leaves to generate a second AC voltage at a second phase that is different from the first phase.

In some aspects, the techniques described herein relate to a method, wherein the operations further include: operating a third leaf of the one or more leaves to generate a third AC voltage at a third phase that is different from the first phase and the second phase.

In some aspects, the techniques described herein relate to a system including: one or more controllers configured to control an operation of one or more leaves and a neutral leaf of a bidirectional alternating current (AC) to direct current (DC) converter (AC-DC converter) to control an AC voltage output of the AC-DC converter.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
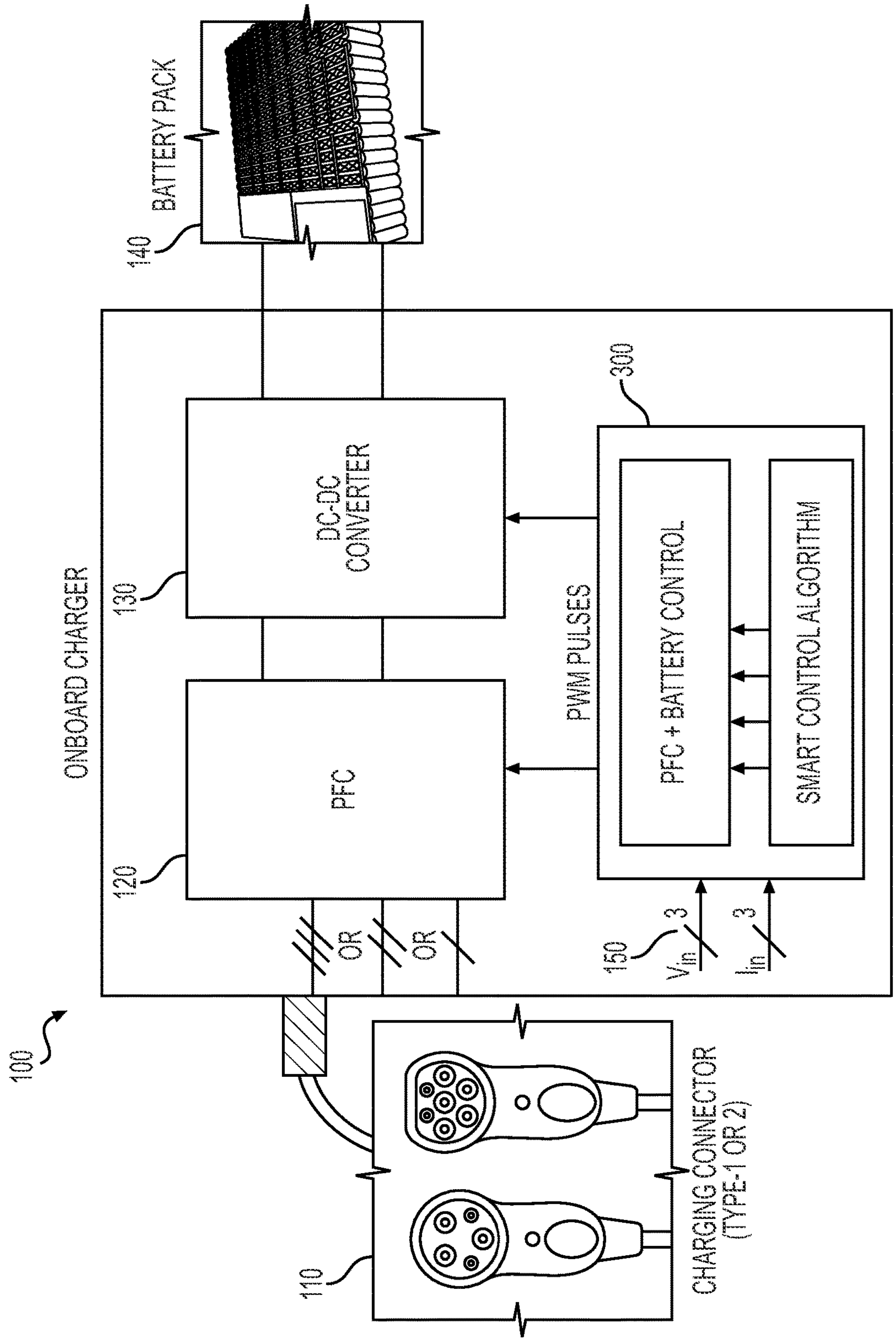
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms “comprises,” “comprising,” “has,” “having,” “includes,” “including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, “about,” “substantially,” and “approximately” are used to indicate a possible variation of +10% in the stated value. In this disclosure, unless stated otherwise, any numeric value may include a possible variation of +10% in the stated value.

Various embodiments of the present disclosure relate generally to systems and methods for a common design for single, split, and three phase inverters for various vehicle applications and, more particularly, to systems and methods for a bidirectional AC-DC converter including one or more leaves for generating one or more single phase AC voltage outputs, three phase AC voltage outputs, or split phase AC voltage outputs for a load.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Electric vehicles (EVs) may be used as vehicles, and also for applications such as energy storage and backup generators, for example. According to one or more embodiments, onboard chargers (OBCs) may have a dual purpose. OBCs may include a bidirectional system that converts alternating current (AC) to direct current (DC) voltage in charging mode and DC to AC voltage in discharge or inverter mode. Charge mode may be used to convert grid AC to DC voltage to charge a high voltage (HV) battery of the vehicle. Discharge or inverter mode may be used to convert the DC voltage from the HV battery into AC voltage to be supplied to the grid, be supplied as a generator to power a house when the grid is not available, or be used as an inverter to supply voltage to vehicle AC outlets.

According to one or more embodiments, a charger may operate with a single-phase or three-phase AC power source. The charger may be designed to support a wide range of HV battery voltage ranges, for example, 400V and 800V systems and maximum output power of 11 kilowatts and 22 kilowatts. A DC-DC Converter with an LLC resonant structure may be used. A PFC converter with a single-phase or three-phase power supply may be employed.

A battery charger according to the disclosure may operate with multiple types of AC input power supplies, including single phase, split/dual/two phase, and three-phase power supplies. The charger may be compatible with a wide range of configurations. An Inductor-Inductor-Capacitor (LLC) converter may be used as a second stage converter using a DC link voltage generated from the PFC as the input voltage for the converter. However, the disclosure is not limited thereto.

The input and output layout of the charger may follow automotive standards. A battery charger according to the disclosure may include a two-stage configuration, including an AC-DC power factor correction converter stage and an isolated DC-DC converter stage. The isolated DC-DC converter may include a full-bridge driver configuration with resonant tank elements to achieve better efficiency. The DC-DC converter may be designed to charge the battery from minimum voltage to maximum voltage.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) configuration may be achieved with a designed control strategy for single-phase, two-phase, and three-phase systems. Switches of the battery charger may be any devices, such as GTO, thyristors, or MOSFETs/IGBTs with series diodes, for example. These switches may also be mechanical components (such as relays or contactors) if sufficient failure rates and arcing conditions during operation are met. Additionally, if the switches are semi-permanent in position, the switches may be implemented as one or more jumper connectors or dual in-line package (DIP) switches.

Electric vehicles, energy storage systems, and backup generators, for example, convert electric power from one form to another. Additionally, an on-board charger for a vehicle, for example, may have a dual purpose. The on-board charger may be a bi-directional system that converts AC voltage to DC voltage in a charging mode (grid-to-battery) and DC voltage to AC voltage in a discharge or inverter mode (battery-to-grid). The charging mode may convert the grid AC into DC voltage to charge the vehicle high voltage (HV) battery, and the discharge or inverter mode may convert the HV battery DC voltage into AC voltage that may be supplied to grid line voltage, be supplied as a backup generator to power a house when the grid is down, or as an inverter to supply voltage to vehicle AC outlets, for example. The on-board charger may have a two-stage design to meet automotive requirements, with an AC-DC power factor converter in a first stage and an isolated DC-DC converter in a second stage.

One or more embodiments may provide a common design to meet vehicle to load, vehicle to grid, and vehicle to vehicle operations to reduce cost and provide a more efficient manufacturing process. The vehicle to load, vehicle to grid, and vehicle to vehicle operations may be referred to as V2X. One or more embodiments may generate all phase type AC voltages so that a vehicle may provide power to different kinds of equipment and loads. One or more embodiments may provide different hardware design and control methods for different AC voltage phase types. One or more embodiments may provide a common design.

According to one or more embodiments, a two-stage design may be used for an OBC to meet automotive requirements. A two-stage design configuration used in single phase and three phase chargers may include AC-DC power factor correction (PFC) converters in stage I and isolated DC-DC converters in stage II. For a discharge or inverter mode of operation, the isolated DC-DC converter may use the battery voltage to charge the bulk capacitor. The PFC converter, which may be used as an inverter, may use the bulk capacitor voltage to generate a required AC voltage output.

In some cases, a single stage design may be used for an OBC and/or V2X inverters for non-isolated systems, where the isolated DC-DC converter in stage II may be removed, and the link voltage may be used as the high voltage battery.

One or more embodiments may provide a common design or hardware to generate different types of AC voltages capable of handling a variety of loads including grid to battery charging operations. One or more embodiments may provide a control methodology to generate single phase, split phase, and three phase AC voltages that may handle variable loads and imbalance in split phase outputs and three phase outputs. One or more embodiments may provide a common design including a V2X inverter using bi-directional onboard charging module (OBCM) design to generate different AC voltage types, such as single phase, split phase, and three phase voltage outputs.

One or more embodiments may provide a bi-directional OBCM for single voltage single phase AC voltage output without hardware modifications. One or more embodiments may provide controls that use slower switching half bridge to switch at higher frequencies to generate varied AC output voltages. One or more embodiments may provide a bi-directional OBCM to generate multiple single phase voltage outputs at different voltage levels that are each synchronized. One or more embodiments may provide a bi-directional OBCM to generate split phase outputs and three phase outputs. One or more embodiments may increase output current from a bidirectional PFC converter with the addition of extra leaves or relay connections.

Some PFC totem-pole designs may be operated in reverse (inverter) mode to generate AC voltage. Slow switching field effect transistors (FETs) may be used to generate the AC pattern and may generate single phase fixed frequency outputs. The generated AC voltage output may be fixed for an outlet.

One or more embodiments may generate a single phase AC voltage output to supply loads using a combination of three leaf PFC modules and AC relays. When the AC relays are turned on, the three leaf operation may use the PFC converter of the V2X inverter to supply more current and reduce the AC output ripple using interleaving methodology.

One or more embodiments may provide a three leaf operation to generate multiple voltages of various levels. The different AC voltage levels may be used to run different kinds of equipment.

One or more embodiments may generate a split phase AC voltage output with respect to a common neutral, with each output having a 180 degree phase shift. One or more embodiments may convert slow switching FETs used in some PFC converters to fast switching FETs to generate split phase outputs. The split phase output have the capability to handle imbalanced loads, such as in daily applications. One or more embodiments may provide an additional single-phase output generated by the PFC converter in addition to the split phase outputs. The split phase outputs, which may be out-of-phase from each other, may be used to run loads that require higher AC voltage. Some of these loads may require a single phase, line to neutral, or AC voltage along with the split phase AC voltage outputs to operate. An imbalance in one of the lines may be created with an additional load, and the imbalance may flow in a line to neutral loop. One or more embodiments may switch a neutral leg, N, at twice line frequency in a single phase operation, minimizing switching losses in corresponding leg devices.

One or more embodiments may switch the neutral leg N at higher frequencies, such as a multiple (e.g., ¼, ½, ¾, 1) of switching frequencies of a line leg to be able to generate split phase AC outputs. For example, a dryer may require 240 VAC to run the rotating drum and 120 VAC to run the panel electronics. This power may need to be provided by a single AC connection. One or more embodiments may provide a system to handle both of these loads simultaneously.

One or more embodiments may generate AC voltage outputs for three phase outputs, and the generated AC voltage outputs may be 120 degree phase shifted from each other with a common neutral. One or more embodiments may handle imbalanced loads. For example, three phase outputs may be used to operate three separate single phase loads or operate a single three phase load. The imbalance that may be caused by the three separate loads may be controlled by one or more controllers or hardware devices.

FIG. 1 depicts an exemplary system infrastructure for a battery charger, according to one or more embodiments. As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, an HV DC-DC (HVDC) converter 130, and a controller 300 receiving signals from input sensor 150. Power Factor Correction (PFC) converter 120 may be an AC-DC converter. HVDC converter 130 may be a DC-DC converter. Controller 300 may include one or more controllers. The battery charger 100 may include or be electrically connectable to an HV battery 140. The battery charger 100 may be used in automotive vehicles as an onboard charger to transfer power from an external power source through charging connector 110 to HV battery 140 in a grid-to-battery operation, or to transfer power from HV battery 140 in a vehicle to grid configuration (a battery-to-grid operation). The battery charger 100 may be included in a system provided as an electric vehicle including a motor configured to rotate based on power received from the HV battery 140.

Figure 2:
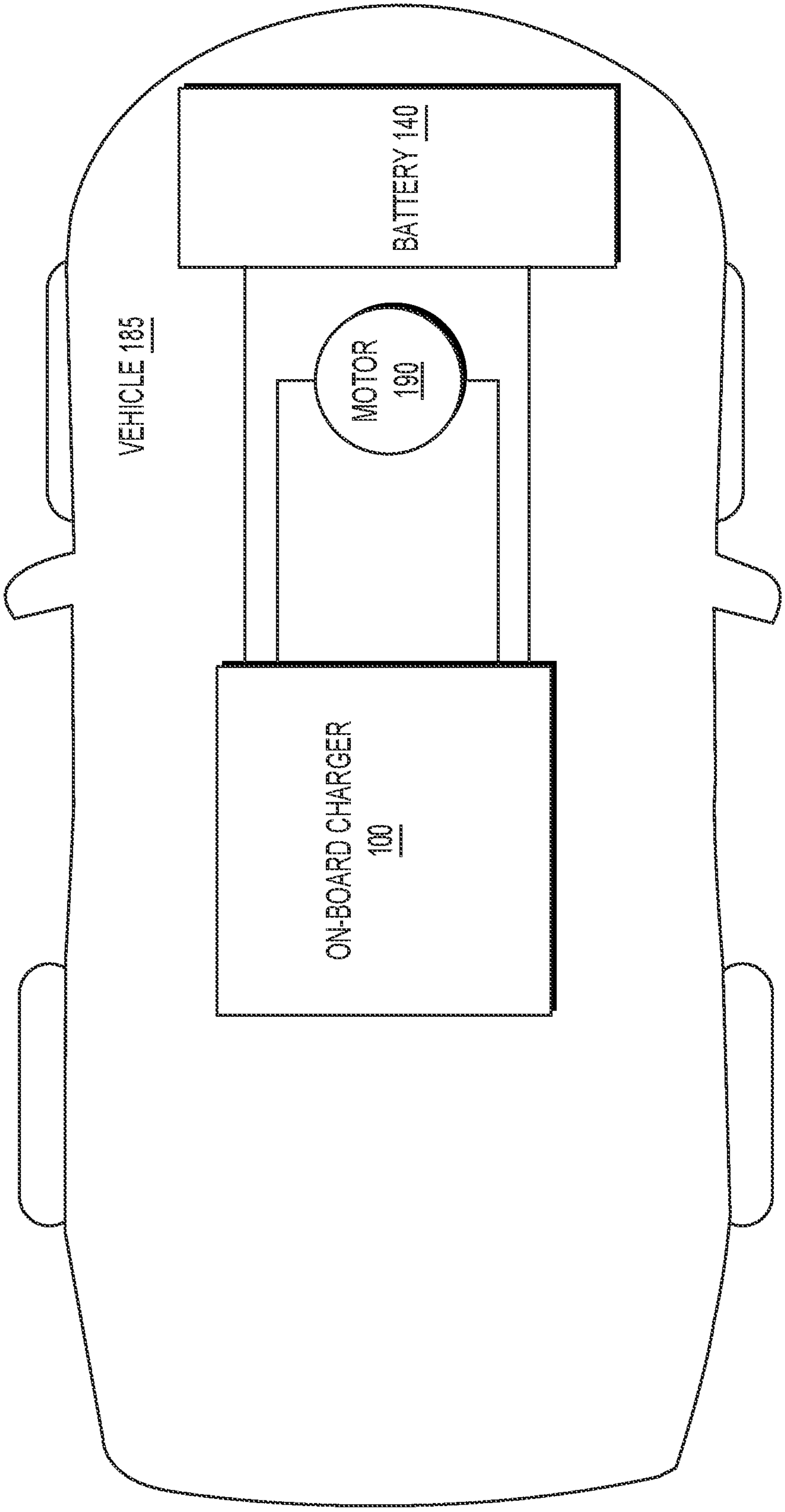
FIG. 2 depicts an exemplary system infrastructure for a vehicle including a battery charger, according to one or more embodiments.

FIG. 2 depicts an exemplary system infrastructure for a vehicle including a battery charger, according to one or more embodiments. The battery charger 100 may be a combined inverter and converter. As shown in FIG. 2, electric vehicle 185 may include battery charger 100, motor 190, and battery 140. Battery charger 100 may include components to receive electrical power from an external source and output electrical power to charge battery 140 of electric vehicle 185. Battery charger 100 may convert DC power from battery 140 in electric vehicle 185 to AC power, to drive motor 190 of the electric vehicle 185, for example, but the embodiments are not limited thereto. Battery charger 100 may convert DC power from battery 140 in electric vehicle 185 to AC power, to drive AC components other than motor 190 of the electric vehicle 185. Although the motor 190 is depicted in FIG. 2 as being connected to the on-board charger 100, the motor 190 may not need to be connected to the battery charger 100 for operation of the battery charger 100 for providing power to the battery 140. Battery charger 100 may be bi-directional, and may convert DC power to AC power, or convert AC power to DC power, such as during regenerative braking, for example. Battery charger 100 may be a three-phase inverter, a single-phase inverter, or a multi-phase inverter.

Although FIG. 2 depicts the battery charger 100 as being included in the electric vehicle 185, the battery charger 100 is not limited thereto. For example, the battery charger 100 may include a V2X inverter connected to the battery 140, where the battery charger 100 may be positioned or located outside of the electric vehicle 185, and supply AC power to various AC loads.

Figure 3:
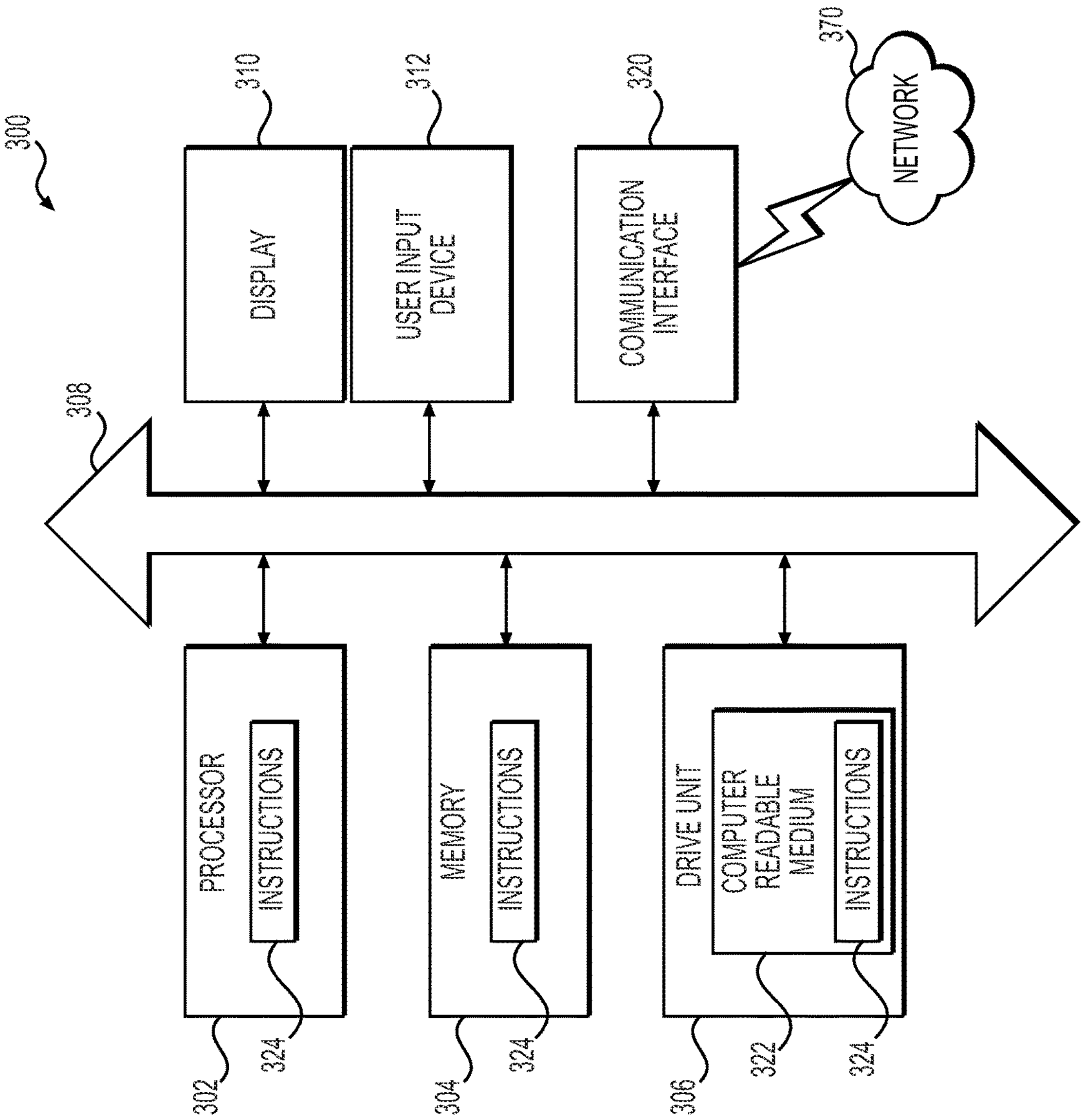
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
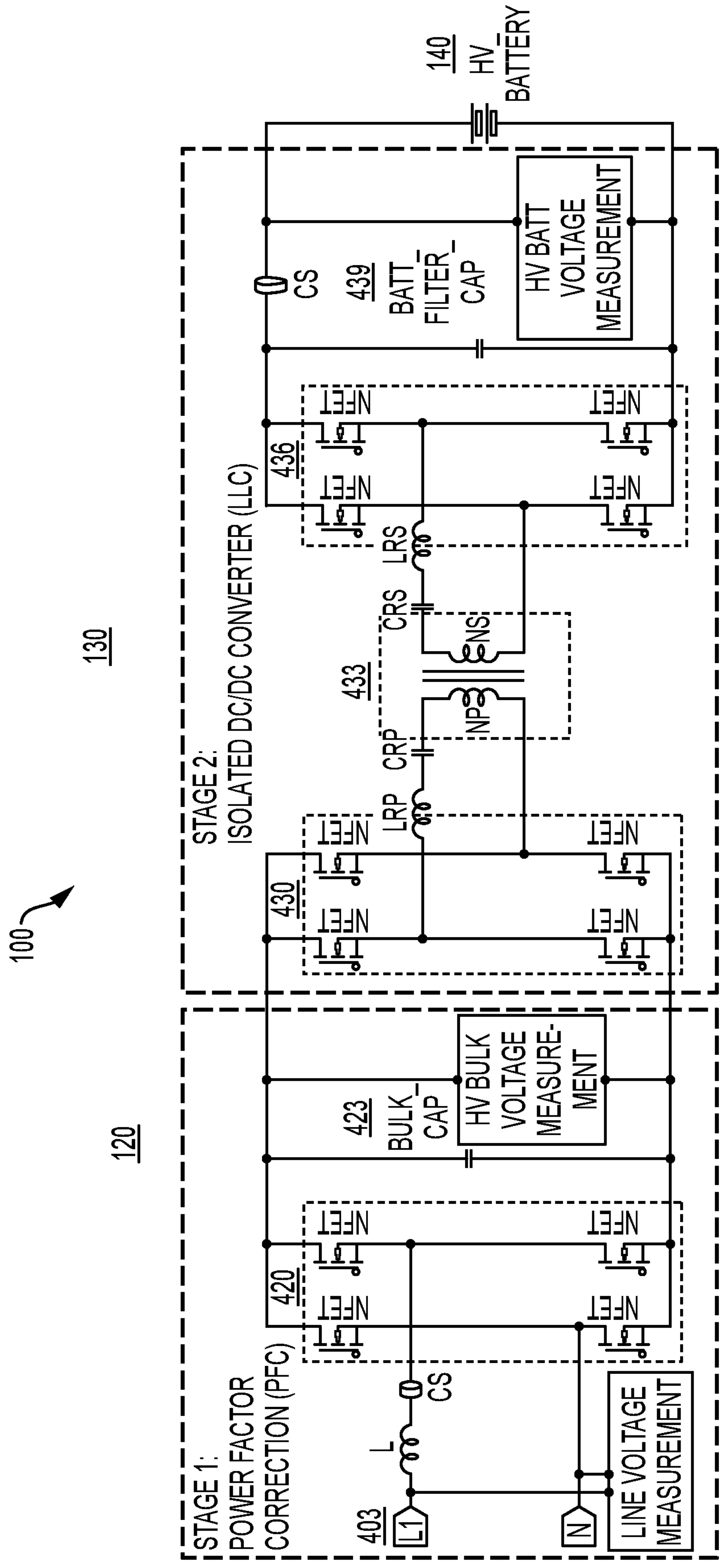
FIG. 4 depicts an exemplary electrical schematic for a single-phase battery charger with a bulk capacitor and a high voltage filter capacitor, according to one or more embodiments.

FIG. 4 depicts an exemplary electrical schematic for a single-phase battery charger with a bulk capacitor and a high voltage filter capacitor, according to one or more embodiments. As shown in FIG. 4, battery charger 100 may include PFC converter 120 and HVDC converter 130. PFC converter 120 may be connected to line voltage 403, which may be a single-phase voltage, for example. HVDC converter 130 may be connected to battery 140. HVDC converter 130 may be operable to isolate PFC converter 120 from HV battery 140. For example, HVDC converter 130 may be a CLLLC converter, or any suitable DC-DC converter.

PFC converter 120 may include PFC converter switch 420 and bulk capacitor 423. PFC converter switch 420 may be one or more switches, such as four NFET switches, for example, as shown in FIG. 4. PFC converter 120 may include other components, such as inductor L, AC line current sensor CS, line voltage detector, and bulk capacitor voltage detector, for example.

HVDC converter 130 may include bridge driver switch 430, one or more transformers 433, bridge rectifier switch 436, and HV filter capacitor 439. The bridge driver switch 430 and the bridge rectifier switch 436 may be embodied as metal oxide semiconductor field effect transistors (MOSFETs), such as silicon carbide (SiC) MOSFETs. Bridge driver switch 430 may be one or more switches, such as four NFET switches, for example, as shown in FIG. 4. Bridge rectifier switch 436 may be one or more switches, such as four NFET switches, for example, as shown in FIG. 4. PFC converter 120 may include other components, such as primary side inductor LRP, secondary side inductor LRS, primary side capacitor CRP, secondary side capacitor CRS, CS, and battery voltage detector, for example.

The battery charger 100 may operate bi-directionally. A vehicle to grid (V2G) configuration may be achieved with a designed control strategy for multiple voltages. The PFC converter 120 may be configured to receive DC power from HV battery 140 through HVDC converter 130, convert the DC power to AC power, and provide the AC power as an output to line voltage 403. The controller 300 may be designed with an algorithm to control an operation of the PFC converter 120 and HVDC converter 130.

In grid to vehicle (G2V) operation, bridge driver switch 430 may be operated as a full bridge driver or a half bridge driver, and transmit power as a square-wave signal from PFC converter 120 to one or more transformers 433. One or more transformers 433 may be one or more high-frequency transformers and may be a single transformer with multiple coils or windings, multiple transformers with single coils or windings, or any combination thereof. One or more transformers 433 may be connected to bridge rectifier switch 436. Bridge rectifier switch 436 may convert the square-wave signal to DC power.

Controller 300 may be designed with and/or configured to execute an algorithm for control of the PFC converter switch 420, bridge driver switch 430, and bridge rectifier switch 436.

Figure 5:
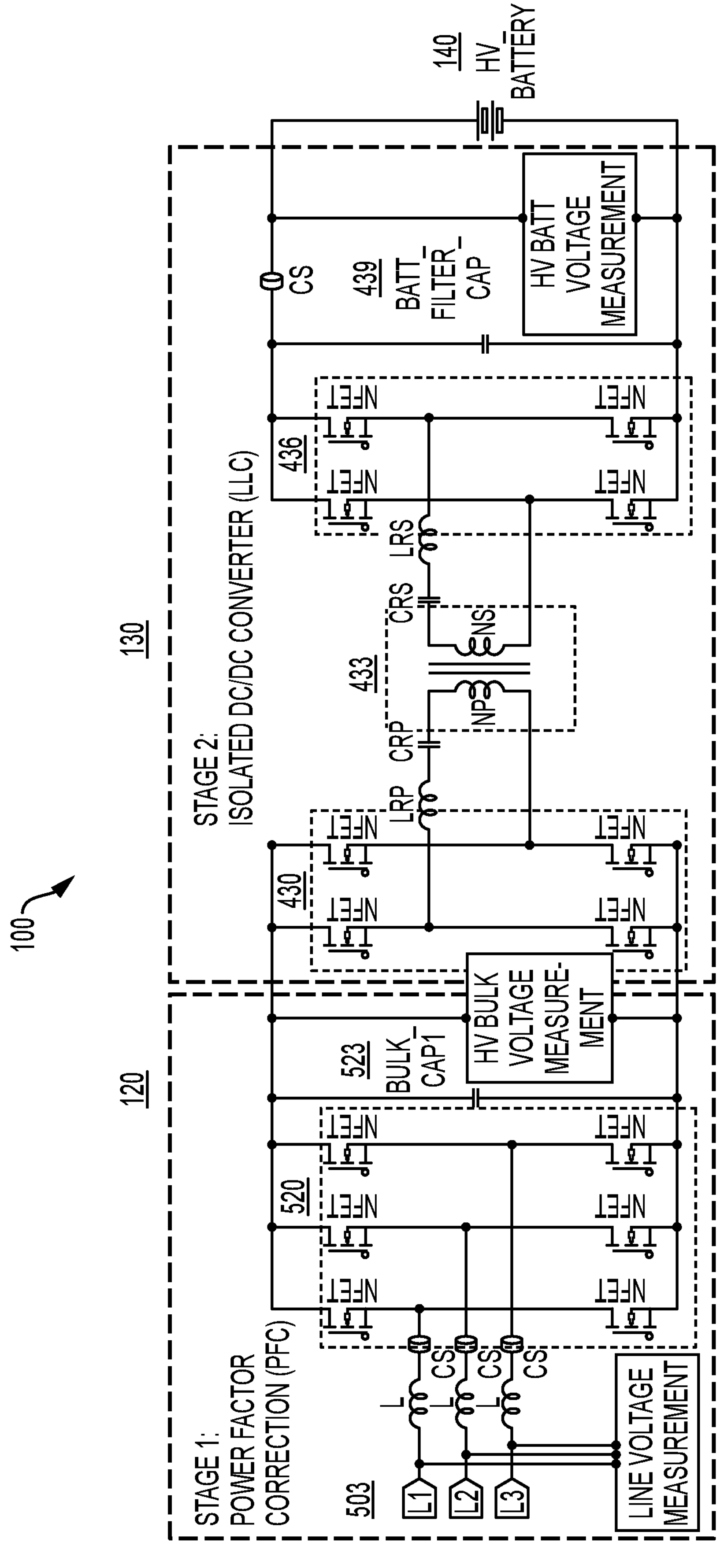
FIG. 5 depicts an exemplary electrical schematic for a three-phase battery charger with a bulk capacitor and a high voltage filter capacitor, according to one or more embodiments.

FIG. 5 depicts an exemplary electrical schematic for a three-phase battery charger with a bulk capacitor and a high voltage filter capacitor, according to one or more embodiments.

As shown in FIG. 5, battery charger 100 may include PFC converter 120 and HVDC converter 130. PFC converter 120 may be connected to line voltage 503, which may be a three-phase voltage, for example. HVDC converter 130 may be connected to battery 140. HVDC converter 130 may be operable to isolate PFC converter 120 from HV battery 140. For example, HVDC converter 130 may be a CLLLC converter, or any suitable DC-DC converter.

PFC converter 120 may include PFC converter switch 520 and bulk capacitor 523. PFC converter switch 520 may be one or more switches, such as six NFET switches, for example, as shown in FIG. 5. PFC converter 120 may include other components, such as an inductor L and CS for each input phase, line voltage detector, and bulk capacitor voltage detector, for example.

HVDC converter 130 may include bridge driver switch 430, one or more transformers 433, bridge rectifier switch 436, and HV filter capacitor 439. Bridge driver switch 430 may be one or more switches, such as four NFET switches, for example, as shown in FIG. 5. Bridge rectifier switch 436 may be one or more switches, such as four NFET switches, for example, as shown in FIG. 5. PFC converter 120 may include other components, such as primary side inductor LRP, secondary side inductor LRS, primary side capacitor CRP, secondary side capacitor CRS, CS, and battery voltage detector, for example.

The battery charger 100 may operate bi-directionally. A vehicle to grid (V2G) configuration may be achieved with a designed control strategy for multiple voltages. The PFC converter 120 may be configured to receive DC power from HV battery 140 through HVDC converter 130, convert the DC power to AC power, and provide the AC power as an output to line voltage 503. The controller 300 may be designed with an algorithm to control an operation of the PFC converter 120 and HVDC converter 130.

In grid to vehicle (G2V) operation, bridge driver switch 430 may be operated as a full bridge driver or a half bridge driver, and transmit power as a square-wave signal from PFC converter 120 to one or more transformers 433. One or more transformers 433 may be one or more high-frequency transformers and may be a single transformer with multiple coils or windings, multiple transformers with single coils or windings, or any combination thereof. One or more transformers 433 may be connected to bridge rectifier switch 436. Bridge rectifier switch 436 may convert the square-wave signal to DC power.

Controller 300 may be designed with and/or configured to execute an algorithm for control of the PFC converter switch 520, bridge driver switch 430, and bridge rectifier switch 436.

Figure 6:
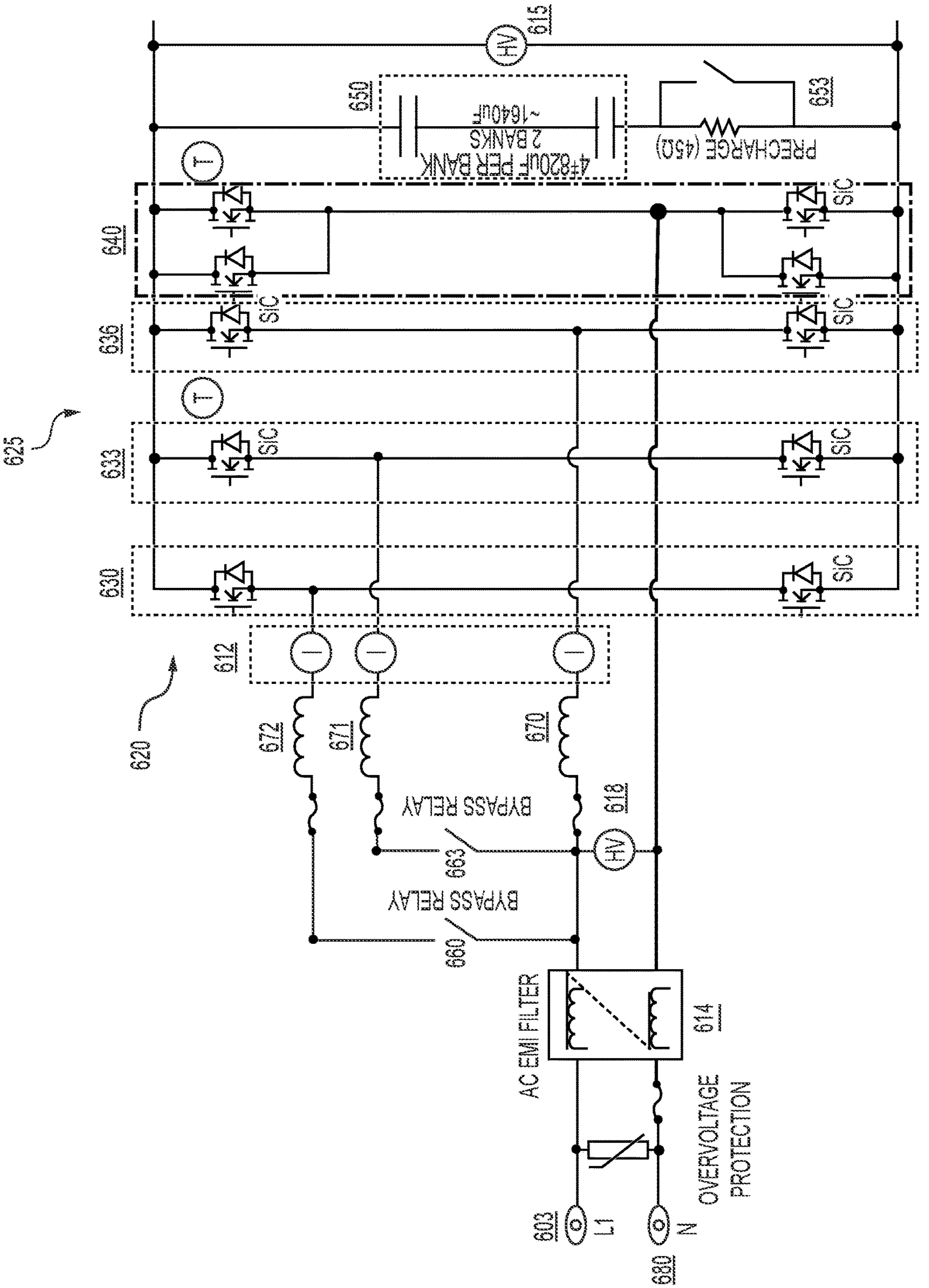
FIG. 6 depicts an exemplary electrical schematic for an AC-DC converter for generating a single phase AC voltage output, according to one or more embodiments.

FIG. 6 depicts an exemplary electrical schematic for a PFC converter 620 for generating a single phase AC voltage output according to one or more embodiments. The PFC converter 620 may include similar components as the PFC converter 120 and may be interchangeable with the PFC converter 120 for use with the HVDC converter 130 in the battery charger 100. The PFC converter 620 may be a bidirectional AC-DC converter configured to operate in charge mode to convert AC voltage to DC voltage or discharge mode ("inverter mode") to convert DC voltage to AC voltage. The PFC converter 620 may be configured to operate in charge mode to convert grid AC into DC voltage to charge the battery 140, for example. The PFC converter 620 may be configured to operate in discharge mode to convert DC voltage from the battery 140 and the HVDC converter 130 into AC voltage to be supplied back to the grid, a backup generator to power a house, or as an inverter to supply voltage to vehicle AC outlets for various loads, among other examples.

The PFC converter 620 may include one or more leaves 625 for generating a voltage output for a load. The one or more leaves 625 may include a first leaf 636, a second leaf 633, and a third leaf 630 for generating an AC voltage output and current for a load. The PFC converter 620 may include a bulk capacitor 650, a pre-charge switch and resistor 653, a first inductor 670, a second inductor 671, a third inductor 672, and an AC EMI filter 614. The PFC converter 620 may include a neutral leaf 640 for providing a current return path for a connectable load. Current in the electrical circuit may be measured at current measurement points 612, among other locations. Voltage in the electrical circuit may be measured at voltage measurement point 615 and voltage measurement point 618, among other locations.

Each leaf of the first leaf 636, the second leaf 633, the third leaf 630, and the neutral leaf 640 may include two or more switches and may be configured to convert AC-DC voltage in charge mode or DC-AC voltage in discharge mode. The neutral leaf 640 may include one or more upper switches and one or more lower switches. The controller 300 may control operation of the PFC converter 620 including operation of the one or more leaves 625 for the charge or discharge mode.

The switches of the one or more leaves 625 and the neutral leaf 640 may be embodied as metal oxide semiconductor field effect transistors (MOSFETs), such as silicon carbide (SIC) MOSFETs. The two or more switches in the first leaf 636 may be connected in series. The two or more switches in the second leaf 633 may be connected in series. The two or more switches in the third leaf 630 may be connected in series. The one or more upper switches of the neutral leaf 640 may be connected in parallel. The one or more lower switches of the neutral leaf 640 may be connected in parallel. The one or more lower switches and the one or more upper switches of the neutral leaf 640 may be connected in series. The first leaf 636, the second leaf 633, the third leaf 630, and the neutral leaf 640 may be connected in parallel. The first inductor 670, the second inductor 671, and the third inductor 672 may be connected to the one or more leaves 625 as depicted in FIG. 6. The bulk capacitor 650 may include two or more bulk capacitors connected in series or a series parallel combination.

Each switch of the one or more leaves 625 and the neutral leaf 640 may be one switch, or may be two or more switches connected in parallel to spread power loss in parallel devices if heat extraction of a single device is not possible. For example, a switch may be one 20 mΩ FET or two 40mΩ FETs connected in parallel. The total RDS (on) for either configuration may be the same, but the parallel FETs may dissipate half of the power each instead of concentrating power in one FET. The neutral leaf 640 may carry the sum of the currents of each individual leaf of the one or more leaves 625 and may need lower RDS (on) FETs and/or more FETs in parallel to reduce and/or spread power dissipation.

The PFC converter 620 shown in FIG. 6 depicts a configuration that may be used for an inverter mode of operation (e.g., DC to AC voltage generation) for the battery charger 100. In operating in the inverter mode, the configuration that may be used is the PFC converter 620 at stage I and the HVDC converter 130 at stage II. For the inverter or discharge mode, the HVDC converter 130 may be configured to use the voltage from the battery 140 to pre-charge the bulk capacitor 650. The PFC converter 620, operating as an inverter, may be configured to use the voltage from the bulk capacitor 650 to generate a required AC voltage output for a load or for a grid depending on characteristics of a connected load.

The PFC converter 620 may be configured to generate a single phase AC voltage output 603 (e.g., L1 line voltage) for a load or a grid. The first leaf 636 may be configured to generate the single phase AC voltage output 603 at a fixed frequency based on operations of the controller 300. The controller 300 may be configured to connect or disconnect the second leaf 633 and/or the third leaf 630 to a connectable load through bypass relay 663 and/or bypass relay 660. The controller 300 may be configured to connect or disconnect the second leaf 633 and/or the third leaf 630 based on a load requirement of the connectable load.

For example, if a load receiving the single phase AC voltage output 603 requires more current, the controller 300 may connect one or both of the bypass relays 660 and 663 to supply more current from the second leaf 633 and/or the third leaf 630. If a load receiving the single phase AC voltage output 603 requires less current, the controller 300 may disconnect one or both of the bypass relays 660 and 663 to stop current flow from the second leaf 633 and/or the third leaf 630 to the load. In the context discussed above, the one or more leaves 625 may be simultaneously connected to a load depending on a load requirement of the load. When the relays are turned on or connected, AC output ripple may be reduced using interleaving technology. The neutral leaf 640 may provide a neutral 680 for return current to flow from a load back to the neutral leaf 640.

Figure 7:
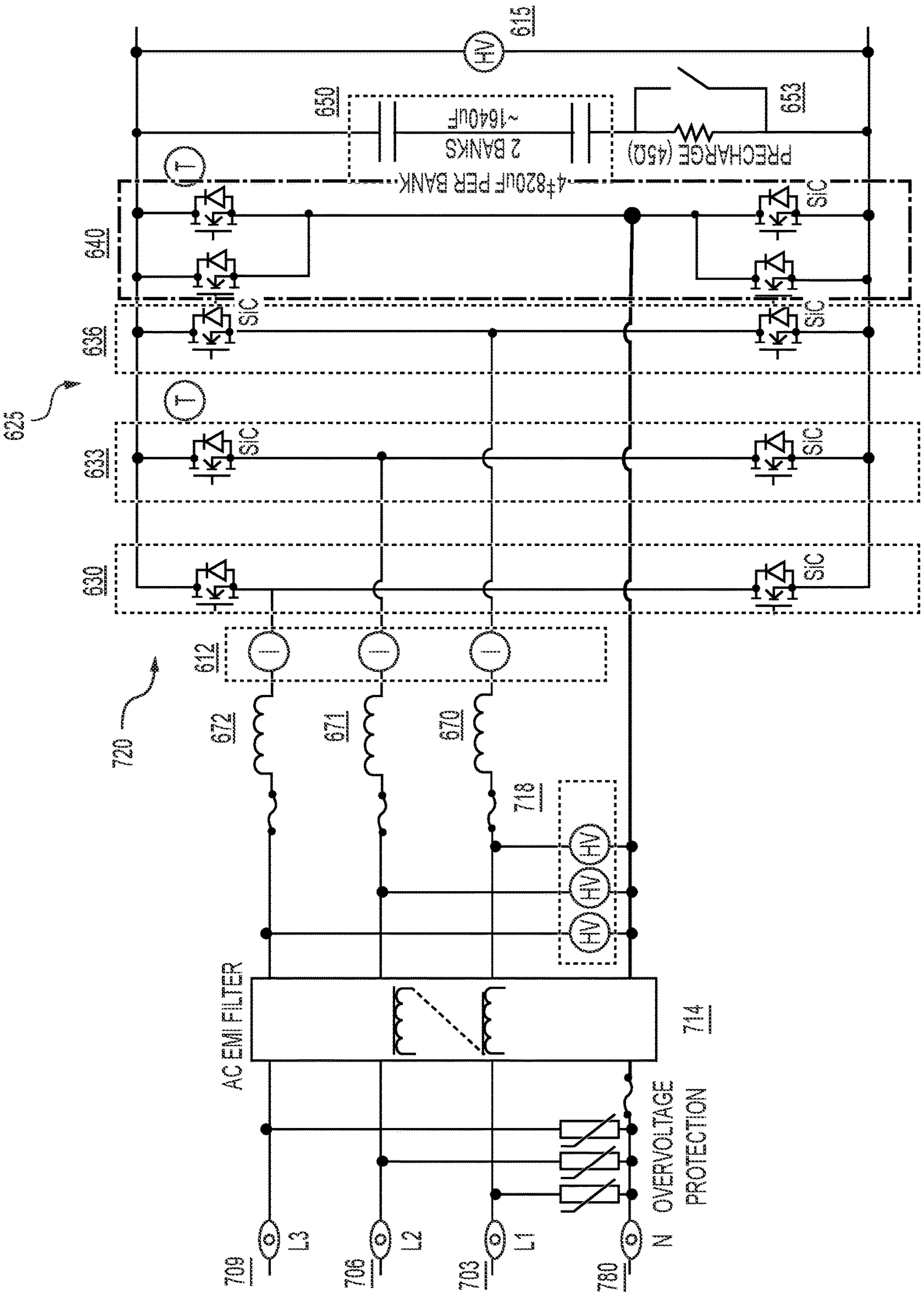
FIG. 7 depicts an exemplary electrical schematic for an AC-DC converter for generating a plurality of AC voltage outputs, according to one or more embodiments.

FIG. 7 depicts an exemplary electrical schematic for a PFC converter 720 for generating a plurality of AC voltage outputs according to one or more embodiments. The PFC converter 720 may include similar components as the PFC converter 120 and may be interchangeable with the PFC converter 120 for use with the HVDC converter 130 in the battery charger 100. The PFC converter 120 may be a bidirectional AC-DC converter configured to operate in charge mode to convert AC voltage to DC voltage or discharge mode ("inverter mode") to convert DC voltage to AC voltage. The PFC converter 720 may be configured to operate in charge mode to convert grid AC into DC voltage to charge the battery 140, for example. The PFC converter 720 may be configured to operate in discharge mode to convert DC voltage from the battery 140 and the HVDC converter 130 into AC voltage to be supplied back to the grid, a back generator to power a house, or as an inverter to supply voltage to vehicle AC outlets for various loads, among other examples.

The PFC converter 720 may include one or more leaves 625 for generating a plurality of voltage outputs for a load. The plurality of voltage outputs may include a plurality of single phase voltage outputs, three phase voltage outputs, or split phase voltage outputs. The one or more leaves 625 may include a first leaf 636, a second leaf 633, and a third leaf 630 for generating a plurality of AC voltage outputs and current for a load. The PFC converter 720 may include a bulk capacitor 650, a pre-charge switch and resistor 653, a first inductor 670, a second inductor 671, a third inductor 672, and an AC EMI filter 714. The PFC converter 720 may include a neutral leaf 640 for providing a current return path for a connectable load. Current in the electrical circuit may be measured at current measurement points 612, among other locations. Voltage in the electrical schematic may be measured at voltage measurement point 615 and voltage measurement point 718, among other locations.

Each leaf of the first leaf 636, the second leaf 633, the third leaf 630, and the neutral leaf 640 may include two or more switches and may be configured to convert AC-DC voltage in charge mode or DC-AC voltage in discharge mode. The neutral leaf 640 may include one or more upper switches and one or more lower switches. The controller 300 may control operation of the PFC converter 720 including operation of the one or more leaves 625 for the charge or discharge mode.

The switches of the one or more leaves 625 and the neutral leaf 640 may be embodied as metal oxide semiconductor field effect transistors (MOSFETs), such as silicon carbide (SIC) MOSFETs. The two or more switches in the first leaf 636 may be connected in series. The two or more switches in the second leaf 633 may be connected in series. The two or more switches in the third leaf 630 may be connected in series. The one or more upper switches of the neutral leaf 640 may be connected in parallel. The one or more lower switches of the neutral leaf 640 may be connected in parallel. The lower one or more switches and the upper one or more switches of the neutral leaf 640 may be connected in series. The first leaf 636, the second leaf 633, the third leaf 630, and the neutral leaf 640 may be connected in parallel. The first inductor 670, the second inductor 671, and the third inductor 672 may be connected to the one or more leaves 625 as depicted in FIG. 7. The bulk capacitor 650 may include two or more bulk capacitors connected in series or a series parallel combination.

The first leaf 636 may be connected to a first line voltage L1. The second leaf 633 may be connected to a second line voltage L2. The third leaf 630 may be connected to a third line voltage L3. The neutral leaf 640 may be connected to a neutral N.

Each switch of the one or more leaves 625 and the neutral leaf 640 may be one switch, or may be two or more switches connected in parallel to spread power loss in parallel devices if heat extraction of a single device is not possible. For example, a switch may be one 20 mΩ FET or two 40 mΩ FETs connected in parallel. The total RDS (on) for either configuration may be the same, but the parallel FETs may dissipate half of the power each instead of concentrating power in one FET. The neutral leaf 640 may carry the sum of the currents of each individual leaf of the one or more leaves 625 and may need lower RDS (on) FETs and/or more FETs in parallel to reduce and/or spread power dissipation.

If operating in phase, the neutral leaf 640 may carry the sum of the currents of each individual leaf of the one or more leaves 625 and may need lower RDS (on) FETs and/or more FETs in parallel to reduce and/or spread power dissipation. In this case, the neutral leaf 640 may be operating at twice the line frequency. If operating out of phase (e.g., three phase outputs), the net current of the neutral leaf 640 may be zero if each phase is balanced. In another example, the net current of the neutral leaf 640 may be less than the current of other leaf currents of the one or more leaves 625 as the neutral leaf 640 may carry the imbalance current. In such a case, the neutral leaf 640 may include the same FET switches as the FET switches of the one or more leaves 625.

The PFC converter 720 shown in FIG. 7 depicts a configuration that may be used for an inverter mode of operation (e.g., DC to AC voltage generation) for the battery charger 100. In operating in the inverter mode, the configuration that may be used is the PFC converter 720 at stage I and the HVDC converter 130 at stage II. For the inverter or discharge mode, the HVDC converter 130 may be configured to use the voltage from the battery 140 to pre-charge the bulk capacitor 650. The PFC converter 720, operating as an inverter, may be configured to use the voltage from the bulk capacitor 650 to generate a required AC voltage output for a load or for a grid depending on characteristics of a connected load.

The PFC converter 720 may be configured to generate up to three single phase AC voltage outputs with same or different amplitudes for a load depending on load requirements of a connected load. In another example, the PFC converter 720 may be configured to generate three phase AC voltage outputs for a load depending on load requirements of a connected load. In another example, the PFC converter 720 may be configured to generate split phase AC voltage outputs for a load depending on load requirements of a connected load.

For generating up to three single phase AC voltage outputs, the first leaf 636 may be configured to generate a first AC voltage output 703 (L1 line voltage) at a fixed frequency based on operations of the controller 300. The second leaf 633 may be configured to generate a second AC voltage output 706 (L2 line voltage) at a fixed frequency based on operations of the controller 300. The third leaf 630 may be configured to generate a third AC voltage output 709 (L3 line voltage) at a fixed frequency based on operations of the controller 300. The first AC voltage output 703, the second AC voltage output 706, and the third AC voltage output 709 that are generated may include different voltage levels that are synchronized or in phase to each other. For example, the first leaf 636 may generate the first AC voltage output 703 at 120V and at 60 Hz, the second leaf 633 may generate the second AC voltage output 706 at 200V at 60 Hz, and the third leaf 630 may generate the third AC voltage output 709 at 240V at 60 Hz. Each of these voltage outputs may be single phase and may be simultaneously connected to multiple loads depending on load requirements of the multiple loads.

For generating three phase AC voltage outputs, each of the first leaf 636, the second leaf 633, and the third leaf 630 may be configured to generate AC voltage outputs that are 120 degrees out of phase relative to each other. For example, a first AC voltage output 703 and a second AC voltage output 706 may be out of phase by 120 degrees. The second AC voltage output 706 and a third AC voltage output 709 may be out of phase by 120 degrees. The one or more leaves 625 may generate the three phase AC voltage outputs to better handle imbalance in loads. To generate three phase AC voltage outputs, each leaf of the one or more leaves 625 may be active. The neutral leaf 640 may be configured to provide a neutral 780 to provide a current return path for a load back to the neutral leaf 640.

For generating split phase AC voltage outputs, the controller 300 may be configured to generate split phase outputs between two lines. For example, a split phase output may be created between lines L1 and L2 based on switching actions at the first leaf 636 and the second leaf 633. An independent L-N (e.g., L3-N) may be synchronized (in phase) with one of the lines L1 and L2. The neutral leaf 640 may be configured to switch at a higher frequency (e.g., leaf frequency/2) to support the split phase operation. The neutral leaf 640 may be configured to switch at a higher frequency to support imbalance in one of the split phase lines by placing a L-N load at one of the split phase lines. Further description regarding split phase operation is discussed with respect to FIG. 8.

Although not depicted in FIG. 7, for generating a plurality of single phase AC voltage outputs, the controller 300 may be configured to connect or disconnect the second leaf 633 and/or the third leaf 630 to a connectable load using the switches of the second leaf 633 and/or the third leaf 630, to change current flow or AC voltage delivered to one or more loads. The controller 300 may be configured to connect or disconnect the second leaf 633 and/or the third leaf 630 based on a load requirement of one or more loads connected to the PFC converter 720. For three phase operation, each of the one or more leaves 625 may be switched on.

Although three leaves are depicted in the one or more leaves 625 in FIG. 7 for generating a plurality of single phase AC voltage outputs, any number of leaves may be added or reduced depending on load requirements of a load connected to the PFC converter 720, to generate more or less single phase AC voltage outputs.

Figure 8:
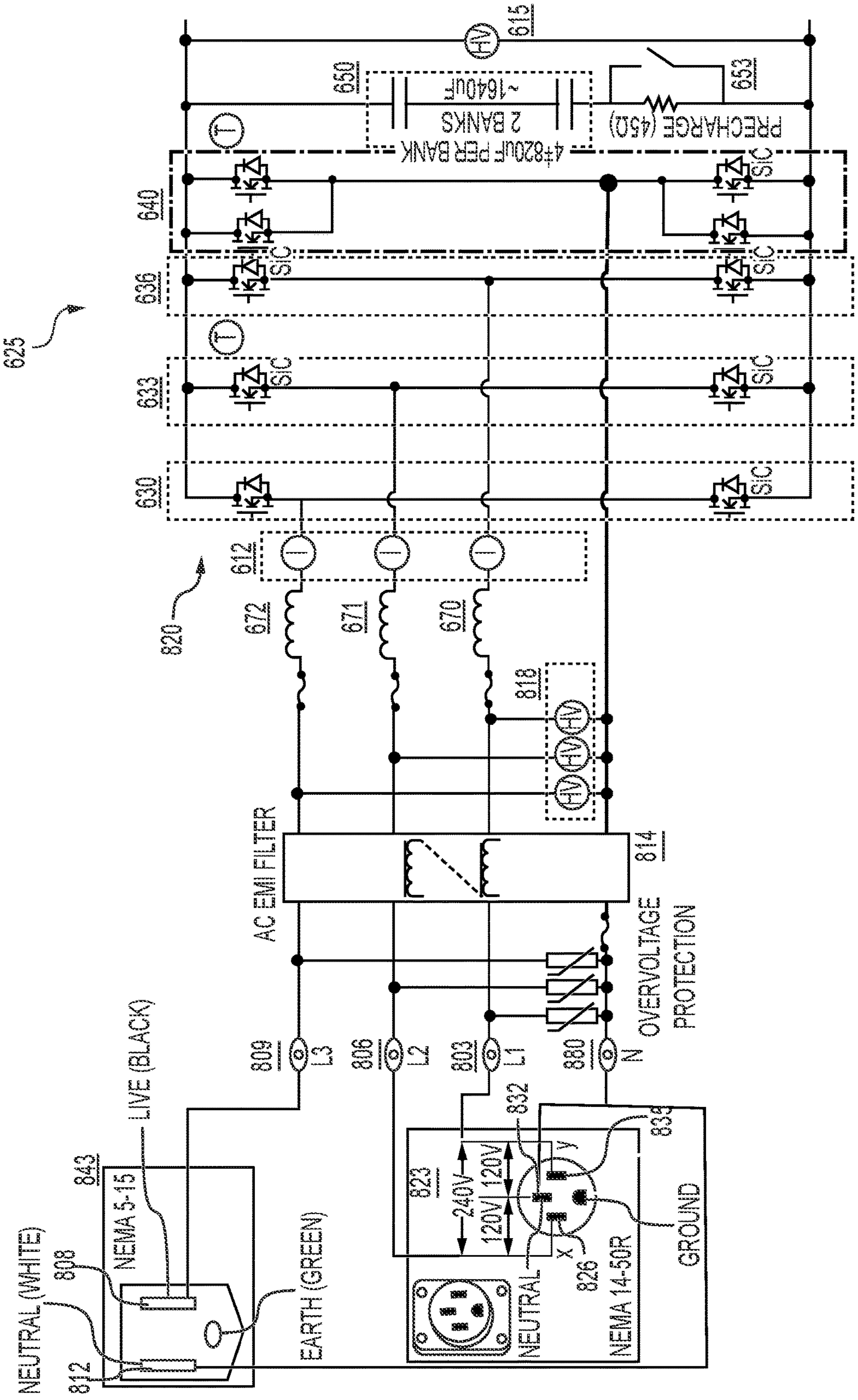
FIG. 8 depicts an exemplary electrical schematic for an AC-DC converter for generating split phase AC voltage outputs, according to one or more embodiments.

FIG. 8 depicts an exemplary electrical schematic for a PFC converter 820 for generating split phase AC voltage outputs according to one or more embodiments. The PFC converter 820 may include similar components as the PFC converter 120 and may be interchangeable with the PFC converter 120 for use with the HVDC converter 130 in the battery charger 100. The PFC converter 820 may be a bidirectional AC-DC converter configured to operate in charge mode to convert AC voltage to DC voltage or discharge mode ("inverter mode") to convert DC voltage to AC voltage. The PFC converter 820 may be configured to operate in charge mode to convert grid AC into DC voltage to charge the battery 140, for example. The PFC converter 820 may be configured to operate in discharge mode to convert DC voltage from the battery 140 and the HVDC converter 130 into AC voltage to be supplied back to the grid, a back generator to power a house, or as an inverter to supply voltage to vehicle AC outlets for various loads, among other examples.

The PFC converter 820 may include one or more leaves 625 for generating a plurality of voltage outputs for a load. The one or more leaves 625 may include a first leaf 636, a second leaf 633, and a third leaf 630 for generating a plurality of AC voltage outputs and current for a load. The PFC converter 820 may include a bulk capacitor 650, a pre-charge switch and resistor 653, a first inductor 670, a second inductor 671, a third inductor 672, and an AC EMI filter 814. The PFC converter 820 may include a neutral leaf 640 for providing a current return path for a connectable load. Current in the electrical circuit may be measured at current measurement points 612, among other locations. Voltage in the electrical schematic may be measured at voltage measurement point 615 and voltage measurement point 818, among other locations.

Each leaf of the first leaf 636, the second leaf 633, the third leaf 630, and the neutral leaf 640 may include two or more switches and may be configured to convert AC-DC voltage in charge mode or DC-AC voltage in discharge mode. The neutral leaf 640 may include one or more upper switches and one or more lower switches. The controller 300 may control operation of the PFC converter 820 including operation of the one or more leaves 625 for the charge or discharge mode.

The switches of the one or more leaves 625 and the neutral leaf 640 may be embodied as metal oxide semiconductor field effect transistors (MOSFETs), such as silicon carbide (SiC) MOSFETs. The two or more switches in the first leaf 636 may be connected in series. The two or more switches in the second leaf 633 may be connected in series. The two or more switches in the third leaf 630 may be connected in series. The one or more upper switches of the neutral leaf 640 may be connected in parallel. The one or more lower switches of the neutral leaf 640 may be connected in parallel. The lower one or more switches and the upper one or more switches of the neutral leaf 640 may be connected in series. The first leaf 636, the second leaf 633, the third leaf 630, and the neutral leaf 640 may be connected in parallel. The first inductor 670, the second inductor 671, and the third inductor 672 may be connected to the one or more leaves 625 as depicted in FIG. 8. The bulk capacitor 650 may include two or more bulk capacitors connected in series or a series parallel combination.

The first leaf 636 may be connected to a first line voltage L1. The second leaf 633 may be connected to a second line voltage L2. The third leaf 630 may be connected to a third line voltage L3. The neutral leaf 640 may be connected to a neutral N.

Each switch of the one or more leaves 625 and the neutral leaf 640 may be one switch, or may be two or more switches connected in parallel to spread power loss in parallel devices if heat extraction of a single device is not possible. For example, a switch may be one 20 mΩ FET or two 40 mΩ FETs connected in parallel. The total RDS (on) for either configuration may be the same, but the parallel FETs may dissipate half of the power each instead of concentrating power in one FET. The neutral leaf 640 may carry the sum of the currents of each individual leaf of the one or more leaves 625 and may need lower RDS (on) FETs and/or more FETs in parallel to reduce and/or spread power dissipation.

The PFC converter 820 shown in FIG. 8 depicts a configuration that may be used for an inverter mode of operation (e.g., DC to AC voltage generation) for the battery charger 100. In operating in the inverter mode, the configuration that may be used is the PFC converter 820 at stage I and the HVDC converter 130 at stage II. For the inverter or discharge mode, the HVDC converter 130 may be configured to use the voltage from the battery 140 to pre-charge the bulk capacitor 650. The PFC converter 820, operating as an inverter, may be configured to use the voltage from the bulk capacitor 650 to generate a required AC voltage output for a load or for a grid depending on load requirements of a connected load.

The PFC converter 820 may be configured to generate split phase AC voltage outputs for a load or for a grid depending on load requirements of a load. The first leaf 636 may be configured to generate a first AC voltage output 803 (L1 line voltage) at a fixed frequency based on operations of the controller 300. The second leaf 633 may be configured to generate a second AC voltage output 806 (L2 line voltage) at a fixed frequency based on operations of the controller 300. The third leaf 630 may be configured to generate a third AC voltage output 809 (L3 line voltage) at a fixed frequency based on operations of the controller 300.

For generating split phase AC voltage outputs, the controller 300 may be configured to generate split phase outputs between two lines. For example, a split phase output may be created between lines L1 and L2 based on switching actions at the first leaf 636 and the second leaf 633. An independent L-N (e.g., L3-N) may be synchronized (in phase) with one of the lines L1 and L2. The neutral leaf 640 may be configured to switch at a higher frequency (e.g., leaf frequency/2) to support the split phase operation. The neutral leaf 640 may be configured to switch at a higher frequency to support imbalance in one of the split phase lines by placing a L-N load at one of the split phase lines.

The first AC voltage output 803 and the second AC voltage output 806 that are generated may be out of phase by 180 degrees. For example, the first AC voltage output 803 and the second AC voltage output 806 may provide power to an outlet 823. The first AC voltage output 803 may be connected to leg 835 of outlet 823, the second AC voltage output 806 may be connected to leg 826 of outlet 823, and a neutral 880 may be connected to leg 832 of outlet 823. As an example, the first AC voltage output 803 and the second AC voltage output 806 that may be generated may correspond to 120V and −120V, respectively, to provide 240V AC voltage to a load. The neutral 880 may provide a current return path for the load back to the neutral leaf 640.

To generate split phase AC voltage outputs, the one or more leaves 625 (e.g. two leaves) may use fast switching FETs. Split phase AC voltage outputs may handle imbalanced loads as expected in some daily applications. The third AC voltage output 809 may be optionally available for one or more separate loads, for example. The third AC voltage output 809 may provide power to an outlet 843. The third AC voltage output 809 may be connected to leg 808 of outlet 843, and the neutral 880 may be connected to leg 812 of outlet 843 to provide a return current path for the one or more separate loads. The first AC voltage output 803, the second AC voltage output 806, and the third AC voltage output 809 may simultaneously be connected and provide power to one or more loads.

Although not depicted in FIG. 8, the controller 300 may be configured to connect or disconnect the second leaf 633 and/or the third leaf 630 to a connectable load using the switches of the second leaf 633 and/or the third leaf 630, to change current flow or AC voltage delivered to one or more loads. The controller 300 may be configured to connect or disconnect the second leaf 633 and/or the third leaf 630 based on a load requirement of one or more loads connected to the PFC converter 820.

Figure 9:
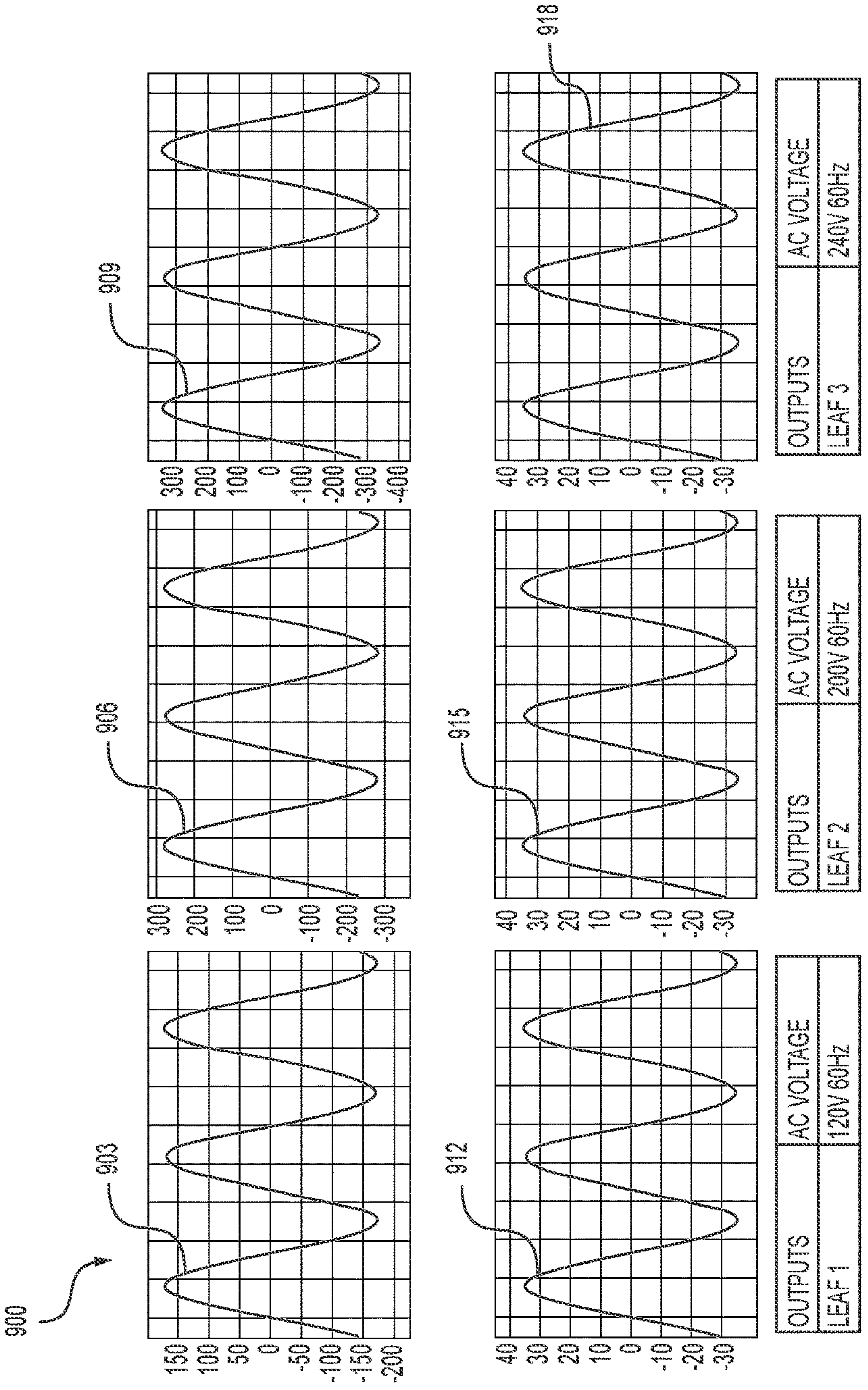
FIG. 9 depicts exemplary waveforms for single phase AC voltage outputs, according to one or more embodiments.

FIG. 9 depicts exemplary waveforms 900 for single phase AC voltage outputs according to one or more embodiments. The exemplary waveforms 900 may include first AC voltage waveform 903 of the first AC voltage output 703, second AC voltage waveform 906 of the second AC voltage output 706, and third AC voltage waveform 909 of the third AC voltage output 709, and associated currents 912, 915, and 918. The waveforms 900 depict 120V at 60 Hz for the first AC voltage waveform 903, 200V at 60 Hz for the second AC voltage waveform 906, and 240 V at 60 Hz for the third AC voltage waveform 909, respectively.

The waveforms 900 also include waveforms of a first leaf current 912, a second leaf current 915, and a third leaf current 918. The first leaf current 912 may be a waveform of a current associated with the first AC voltage output 703. The second leaf current 915 may be a waveform of a current associated with the second AC voltage output 706. The third leaf current 918 may be a waveform of a current associated with the third AC voltage output 709. The currents associated with the first AC voltage output 703, the second AC voltage output 706, and the third AC voltage output 709 may be equal in value.

Figure 10:
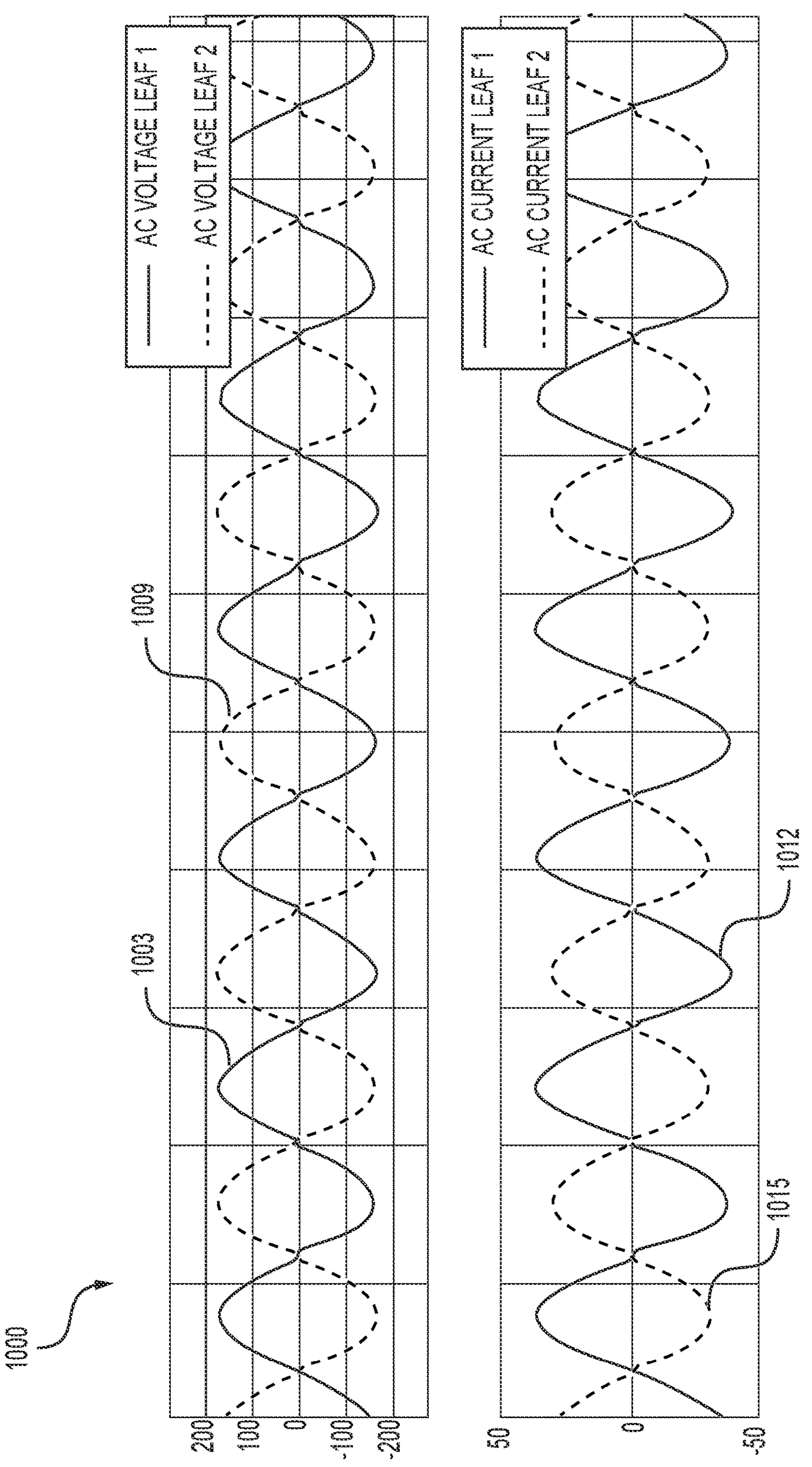
FIG. 10 depicts exemplary waveforms for split phase AC voltage outputs, according to one or more embodiments.

FIG. 10 depicts exemplary waveforms 1000 for split phase AC voltage outputs according to one or more embodiments. The exemplary waveforms 1000 may include first AC voltage waveform 1003 of the first AC voltage output 803 and second AC voltage waveform 1009 of the second AC voltage output 806, and associated currents 1012 and 1015. The first AC voltage waveform 1003 and the second AC voltage waveform 1009 depict a 180 degree phase shift between the first AC voltage output 803 and the second AC voltage output 806.

The exemplary waveforms 1000 also include waveforms of a first leaf current 1012 and a second leaf current 1015. The first leaf current 1012 may be a waveform of a current associated with the first AC voltage output 803. The second leaf current 1015 may be a waveform of a current associated with the second AC voltage output 806. The waveforms 1000 depicts a 180 degree phase shift between the first leaf current 1012 and the second leaf current 1015.

Figure 11:
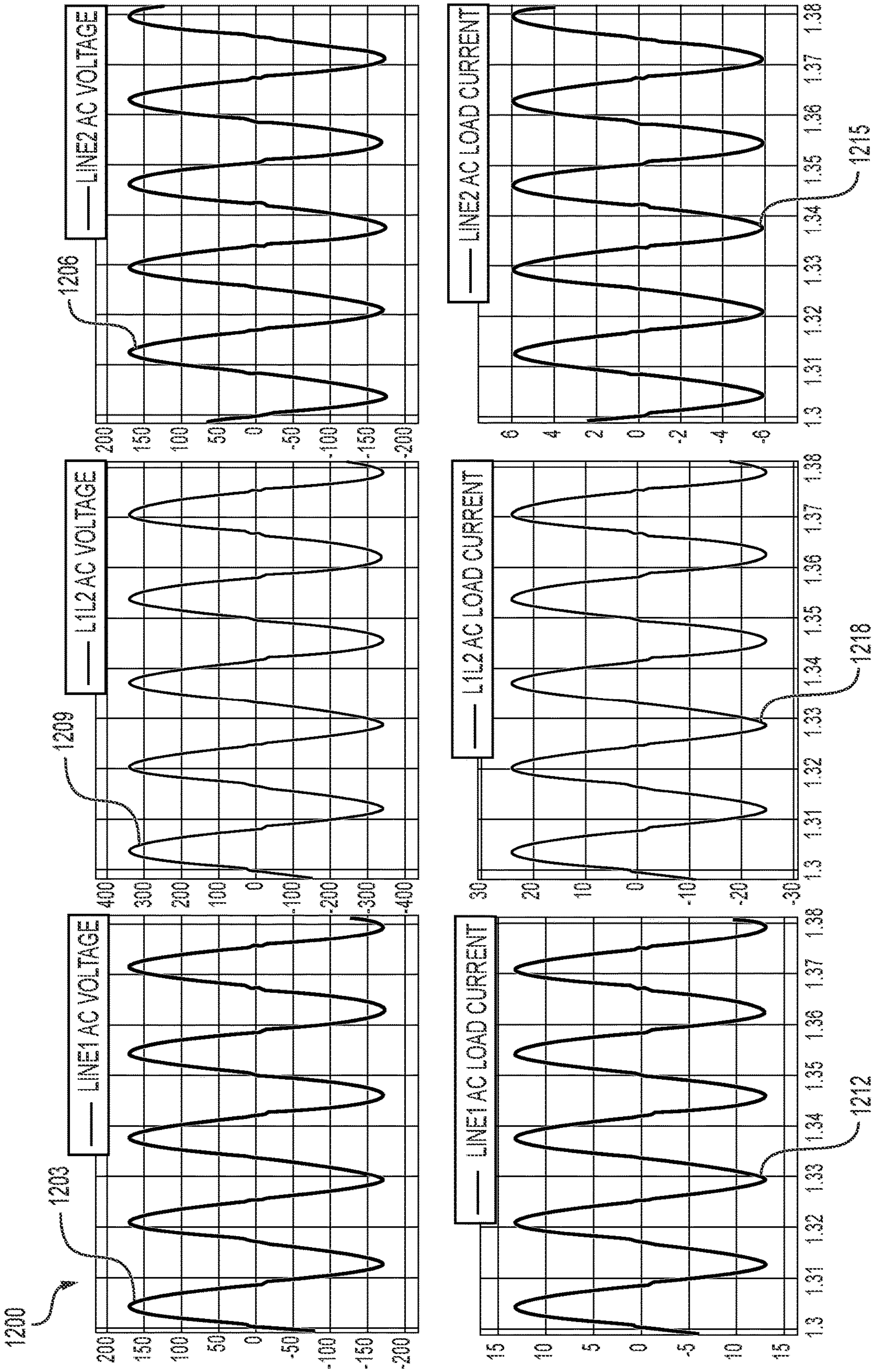
FIG. 11 depicts exemplary waveforms for split phase AC voltage outputs including a waveform for a combined L1L2 AC voltage output, according to one or more embodiments.

FIG. 11 depicts exemplary waveforms 1200 for split phase AC voltage outputs including a waveform for a combined L1L2 AC voltage output according to one or more embodiments. The exemplary waveforms 1200 may include first AC voltage waveform 1203 of the first AC voltage output 803, second AC voltage waveform 1206 of the second AC voltage output 806, a combined AC voltage waveform 1209 of the first AC voltage output 803 and the second AC voltage output 806, and associated currents 1212, 1215, and 1218. The first AC voltage waveform 1203 and the second AC voltage waveform 1206 depict a 180 degree phase shift between the first AC voltage output 803 and the second AC voltage output 806. As shown in FIG. 11, combined AC voltage waveform 1209 may be 240V as a combination of first AC voltage waveform 1203 at 120V and the phase shifted second AC voltage waveform 1206 at −120V.

The exemplary waveforms 1200 also include waveforms of a first leaf current 1212, a second leaf current 1215, and a combined leaf current 1218. The first leaf current 1212 may be a waveform of a current associated with the first AC voltage output 803. The second leaf current 1215 may be a waveform of a current associated with the second AC voltage output 806. The combined leaf current 1218 may be a combined current associated with the combination of the first AC voltage output 803 and the combination of the second AC voltage output 806.

Figure 12:
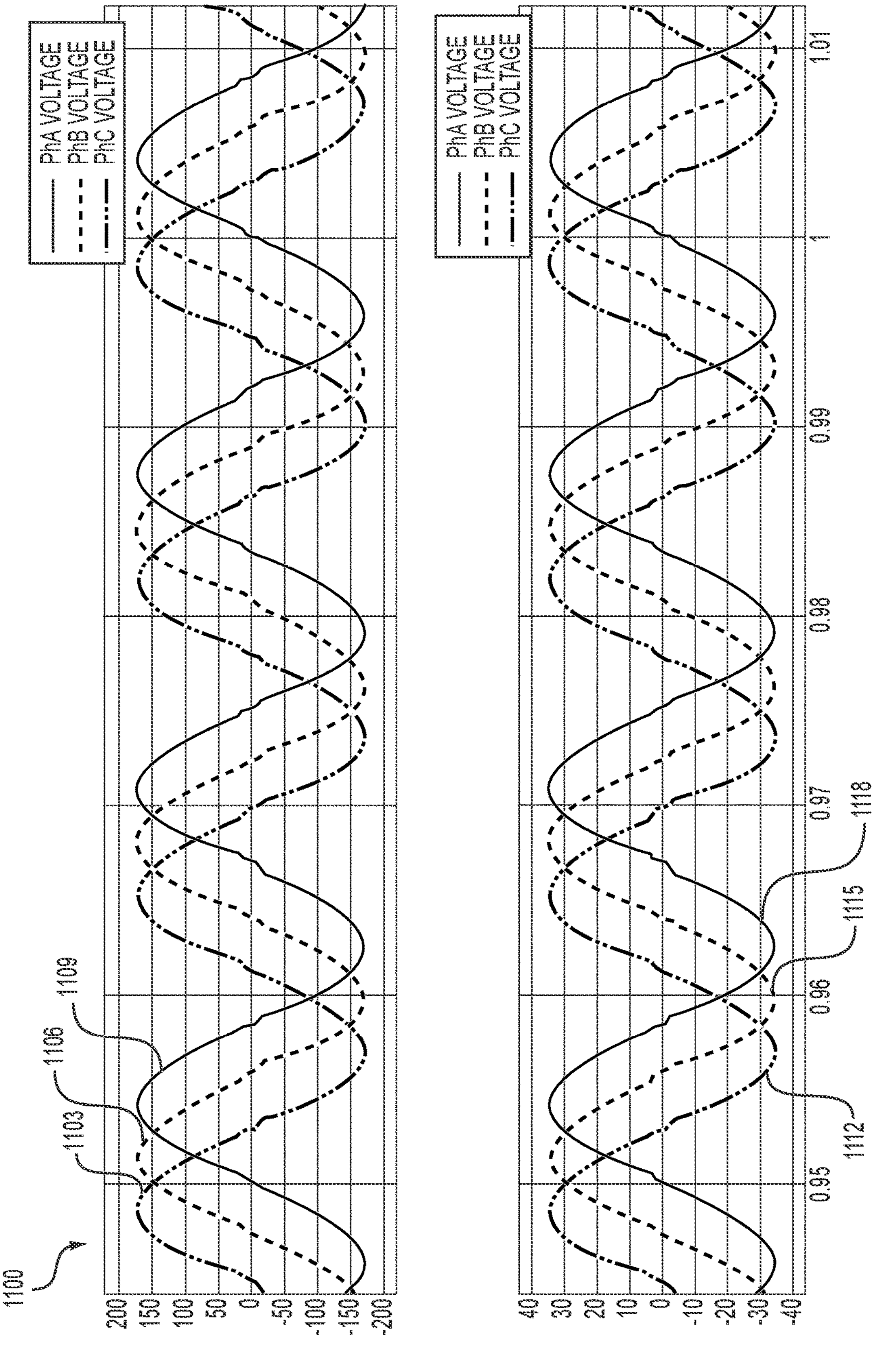
FIG. 12 depicts exemplary waveforms for three phase AC voltage outputs, according to one or more embodiments.

FIG. 12 depicts exemplary waveforms 1100 for three phase AC voltage outputs according to one or more embodiments. The exemplary waveforms 1100 may include first AC voltage waveform 1103 of the first AC voltage output 703, second AC voltage waveform 1106 of the second AC voltage output 706, and third AC voltage waveform 1109 of the third AC voltage output 709, and associated currents 1112, 1115, and 1118. The waveforms 1100 depict a 120 degree phase shift between each of the first AC voltage output 703, the second AC voltage output 706, and the third AC voltage output 709.

The waveforms 1100 also include waveforms of a first leaf current 1112, a second leaf current 1115, and a third leaf current 1118. The waveforms 1100 depict a 120 degree phase shift between each of the first leaf current 1112, the second leaf current 1115, and the third leaf current 1118.

One or more embodiments may provide a common design to meet vehicle to load, vehicle to grid, and vehicle to vehicle operations to reduce cost and provide a more efficient manufacturing process. The vehicle to load, vehicle to grid, and vehicle to vehicle operations may be referred to as V2X. One or more embodiments may generate all phase type AC voltages so that a vehicle may provide power to different kinds of equipment and loads. One or more embodiments may provide different hardware design and control methods for different AC voltage phase types. One or more embodiments may provide a common design to generate the various AC voltage types described above.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:

a bidirectional alternating current (AC) to direct current (DC) converter (AC-DC converter) connectable to a line voltage and a battery, the AC-DC converter including:

one or more leaves connectable to the line voltage and the battery, the one or more leaves configured to receive DC voltage from the battery and generate AC voltage for the line voltage, wherein each leaf of the one or more leaves includes an upper switch and a lower switch, and a neutral leaf connectable to the line voltage and the battery, the neutral leaf configured to provide a return path for the generated AC voltage from the line voltage to the AC-DC converter, wherein the neutral leaf includes an upper switch and a lower switch and is configured to convert AC voltage to DC voltage in a charge mode or DC voltage to AC voltage in a discharge mode, and wherein the neutral leaf is configured to carry a sum of currents of each individual leaf of the one or more leaves; and one or more controllers configured to control an operation of the one or more leaves and the neutral leaf to control the AC voltage, wherein the one or more controllers are configured to operate the upper switch and the lower switch of each leaf to control the AC voltage, and wherein the one or more controllers are configured to operate the upper switch and the lower switch of the neutral leaf at a higher switching frequency than the upper switch and the lower switch of each leaf.

2. The system of claim 1, wherein the one or more controllers are configured to control the operation of the one or more leaves and the neutral leaf to control the AC voltage to be each of a single phase AC voltage, a three phase AC voltage, and a split phase AC voltage.

3. The system of claim 1, wherein:

the one or more leaves includes a first leaf and a second leaf, the one or more controllers are configured to operate the first leaf to generate a first AC voltage at a first voltage level, and the one or more controllers are configured to operate the second leaf to generate a second AC voltage at a second voltage level that is different from the first voltage level.

4. The system of claim 1, wherein:

the one or more leaves includes a first leaf and a second leaf, the one or more controllers are configured to operate the first leaf to generate a first AC voltage at a first phase, and the one or more controllers are configured to operate the second leaf to generate a second AC voltage at a second phase that is different from the first phase.

5. The system of claim 4, wherein:

the AC voltage is a split phase voltage, and the first phase and the second phase are 180 degrees from each other.

6. The system of claim 4, wherein:

the one or more leaves includes a third leaf, and the one or more controllers are configured to operate the third leaf to generate a third AC voltage at a third phase that is different from the first phase and the second phase.

7. The system of claim 6, wherein:

the AC voltage is a three phase voltage, and the first phase, the second phase, and the third phase are 120 degrees from each other.

8. The system of claim 1, further comprising:

one or more bypass relays connected to the one or more leaves, wherein the one or more controllers are further configured to operate the one or more bypass relays to control the AC voltage.

9. The system of claim 1, wherein:

the one or more leaves includes a first leaf and a second leaf, and the one or more controllers are configured to operate the first leaf and the second leaf to increase a current output of the AC-DC converter to the line voltage.

10. The system of claim 1, further comprising:

a DC to DC converter (DC-DC converter) connected to the AC-DC converter, the DC-DC converter connectable to the battery to connect the AC-DC converter to the battery.

11. The system of claim 10, further comprising:

the battery connected to the DC-DC converter, wherein the system is provided as a bidirectional battery charger configured to:

receive input AC power from the line voltage through the AC-DC converter, convert the AC power to DC power, and supply the DC power to the battery to charge the battery in a grid-to-battery operation, and receive DC power from the battery through the DC-DC converter, convert the DC power to AC power, and supply the AC power to a load of the line voltage as output AC power in a battery-to-grid operation.

12. The system of claim 11, further comprising:

an electric vehicle including the battery connected to the DC-DC converter, wherein the battery-to-grid operation is operable to supply electric power from the battery to an AC outlet of the electric vehicle as the load of the line voltage.

13. A method for controlling a system including a bidirectional alternating current (AC) to direct current (DC) converter (AC-DC converter) connectable to a line voltage and a battery, the AC-DC converter including: one or more leaves connectable to the line voltage and the battery, the one or more leaves configured to receive DC voltage from the battery and generate AC voltage for the line voltage, wherein each leaf of the one or more leaves includes an upper switch and a lower switch, and a neutral leaf connectable to the line voltage and the battery, the neutral leaf configured to provide a return path for the generated AC voltage from the line voltage to the AC-DC converter, wherein the neutral leaf includes an upper switch and a lower switch and is configured to convert AC voltage to DC voltage in a charge mode or DC voltage to AC voltage in a discharge mode, and wherein the neutral leaf is configured to carry a sum of currents of each individual leaf of the one or more leaves, the method comprising:

performing, by one or more controllers, operations including:

controlling an operation of the one or more leaves and the neutral leaf to control the AC voltage, wherein the one or more controllers are configured to operate the upper switch and the lower switch of each leaf to control the AC voltage, and wherein the one or more controllers are configured to operate the upper switch and the lower switch of the neutral leaf at a higher switching frequency than the upper switch and the lower switch of each leaf.

14. The method of claim 13, wherein the operations further include:

controlling the operation of the one or more leaves and the neutral leaf to control the AC voltage to be each of a single phase AC voltage, a three phase AC voltage, and a split phase AC voltage.

15. The method of claim 13, wherein the operations further include:

operating a first leaf of the one or more leaves to generate a first AC voltage at a first voltage level, and operating a second leaf of the one or more leaves to generate a second AC voltage at a second voltage level that is different from the first voltage level.

16. The method of claim 13, wherein the operations further include:

operating a first leaf of the one or more leaves to generate a first AC voltage at a first phase, and operating a second leaf of the one or more leaves to generate a second AC voltage at a second phase that is different from the first phase.

17. The method of claim 16, wherein the operations further include:

operating a third leaf of the one or more leaves to generate a third AC voltage at a third phase that is different from the first phase and the second phase.

18. A system comprising:

one or more controllers configured to control an operation of one or more leaves and a neutral leaf of a bidirectional alternating current (AC) to direct current (DC) converter (AC-DC converter) to control an AC voltage output of the AC-DC converter, wherein each leaf of the one or more leaves includes an upper switch and a lower switch, and wherein the one or more controllers are configured to operate the upper switch and the lower switch of each leaf to control the AC voltage output, wherein the neutral leaf includes an upper switch and a lower switch and is configured to convert AC voltage to DC voltage in a charge mode or DC voltage to AC voltage in a discharge mode, and wherein the neutral leaf is configured to carry a sum of currents of each individual leaf of the one or more leaves, and wherein the one or more controllers are configured to operate the upper switch and the lower switch of the neutral leaf at a higher switching frequency than the upper switch and the lower switch of each leaf.

* * * * *